Feb. 5, 1924.                                                                    1,482,474
G. MANIERRE
MACHINE FOR UNLOADING RAILROAD CARS
Filed Oct. 2, 1920                              12 Sheets-Sheet 1
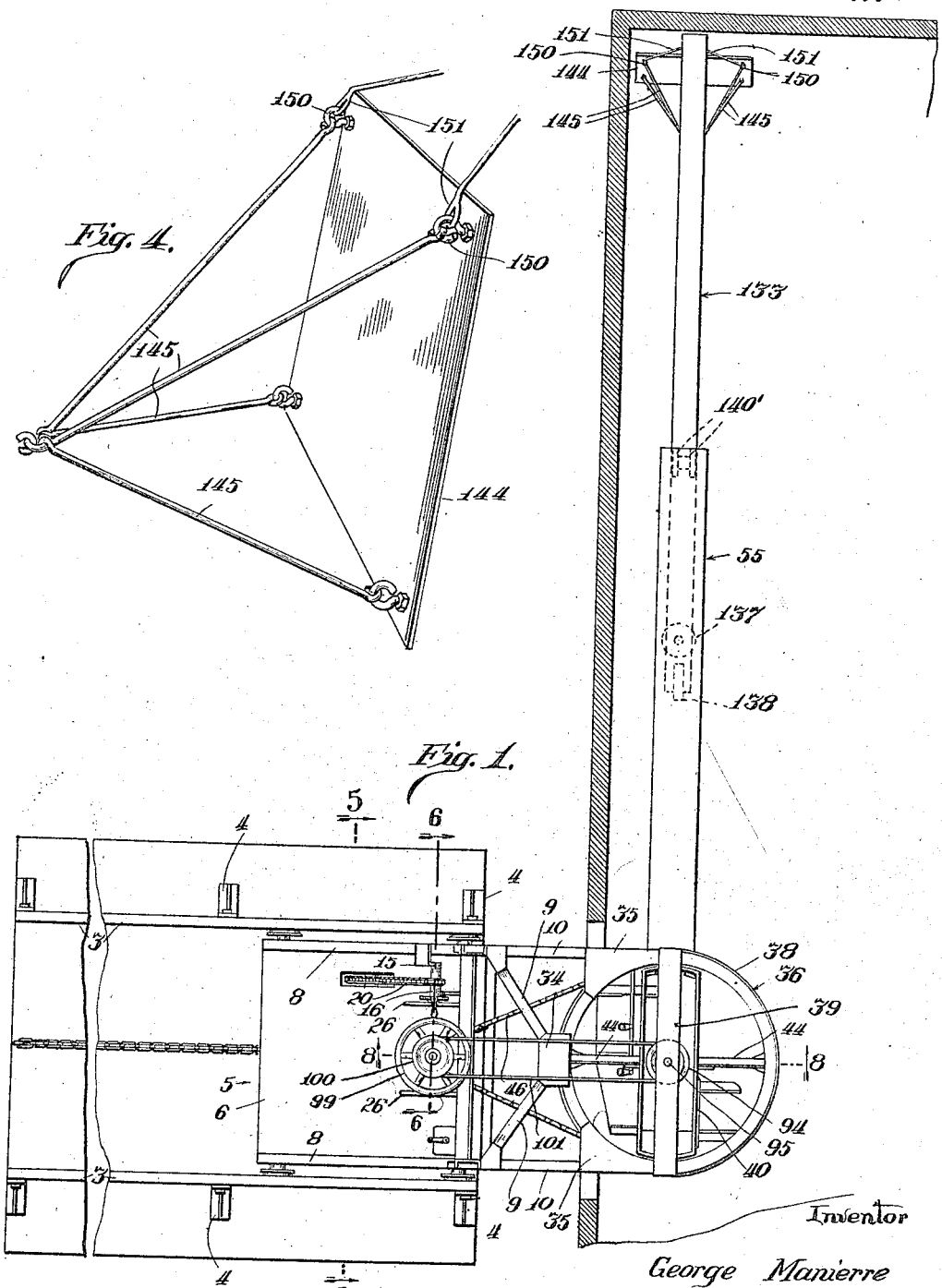
Inventor
George Manierre
By Daniel J. Brennan
Attorney.

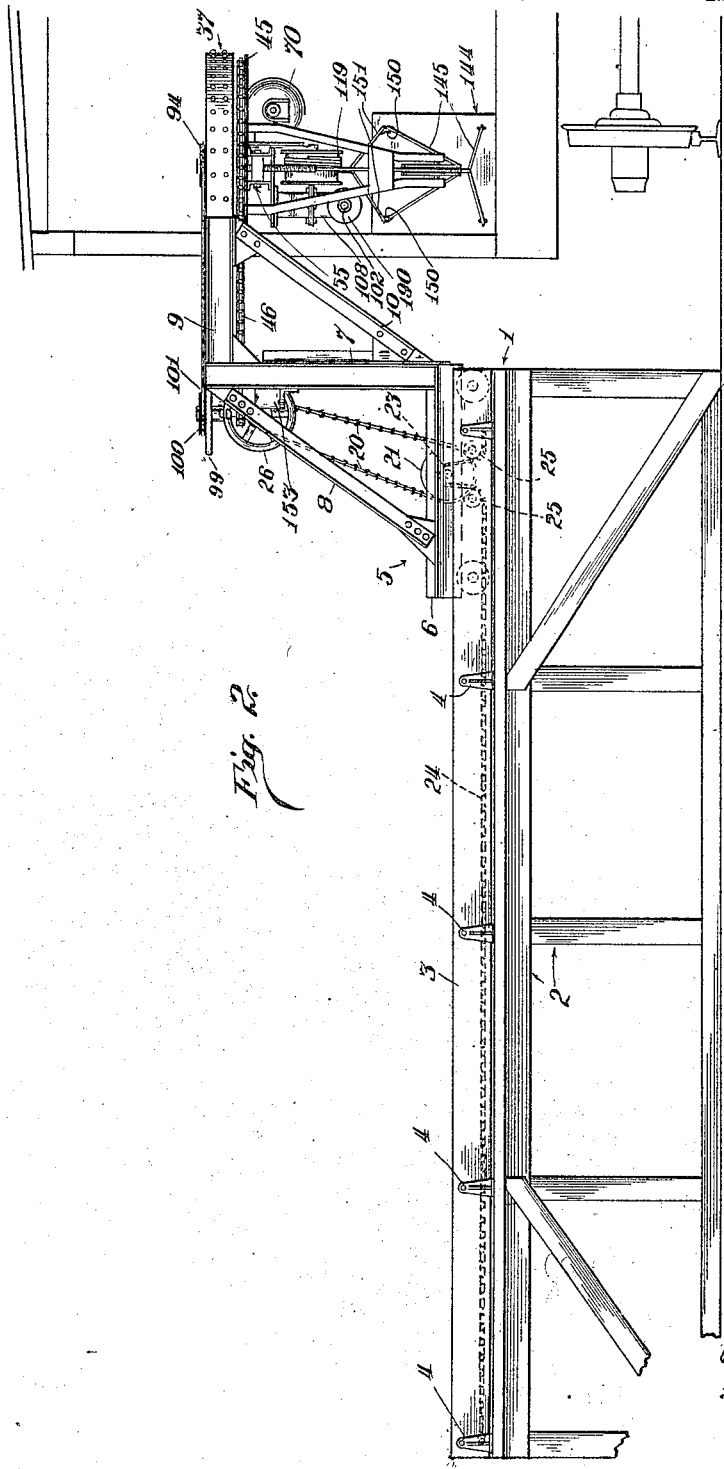

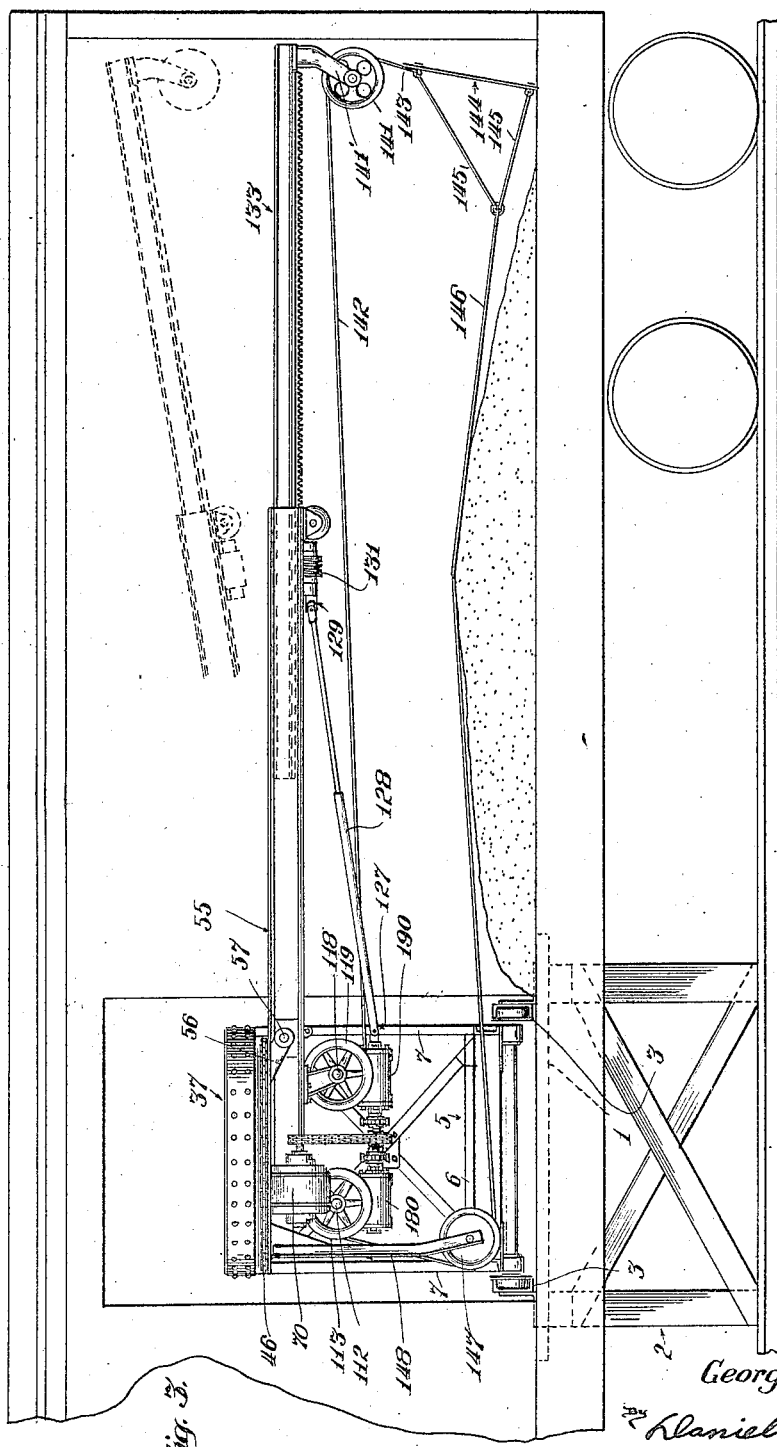

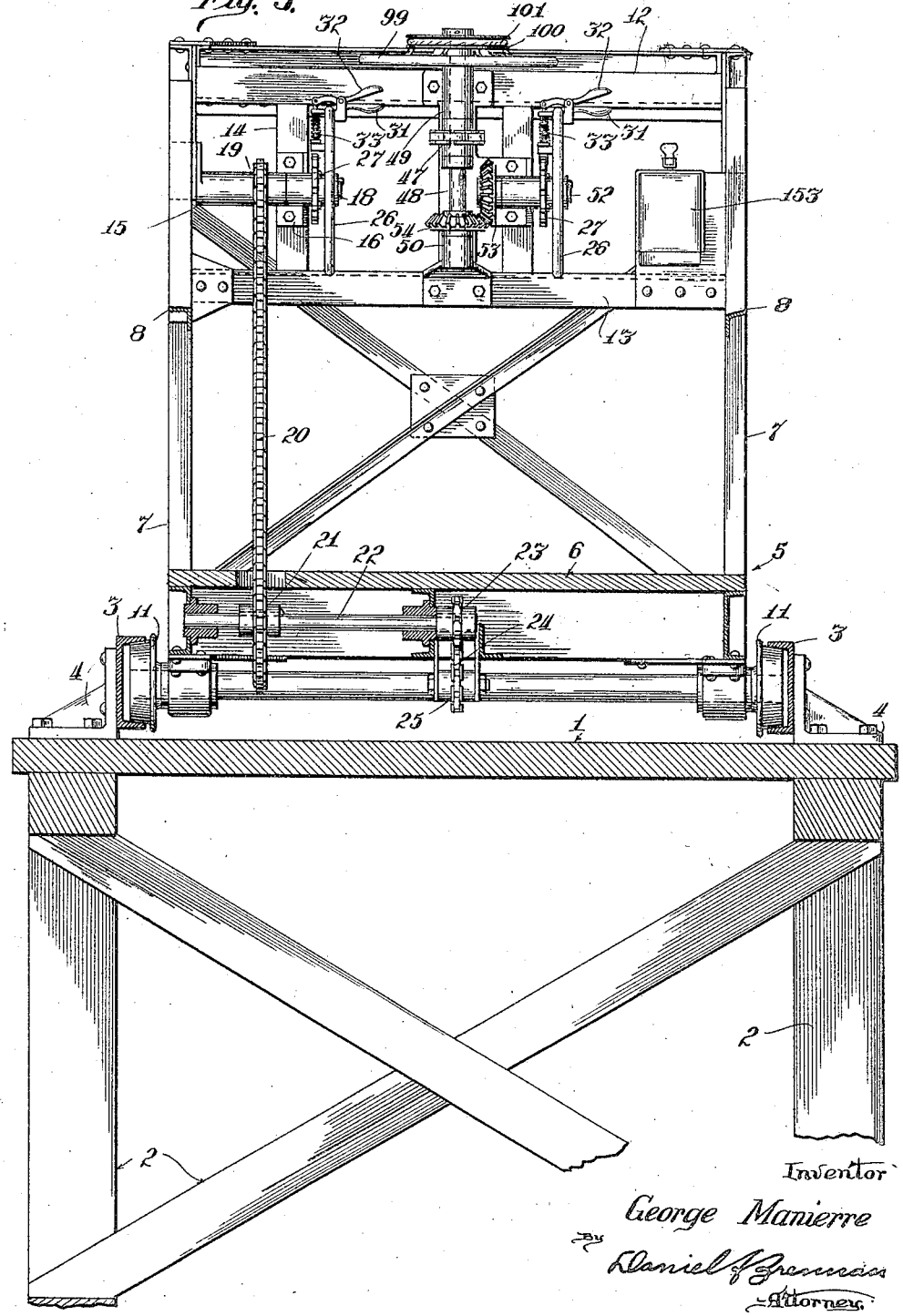

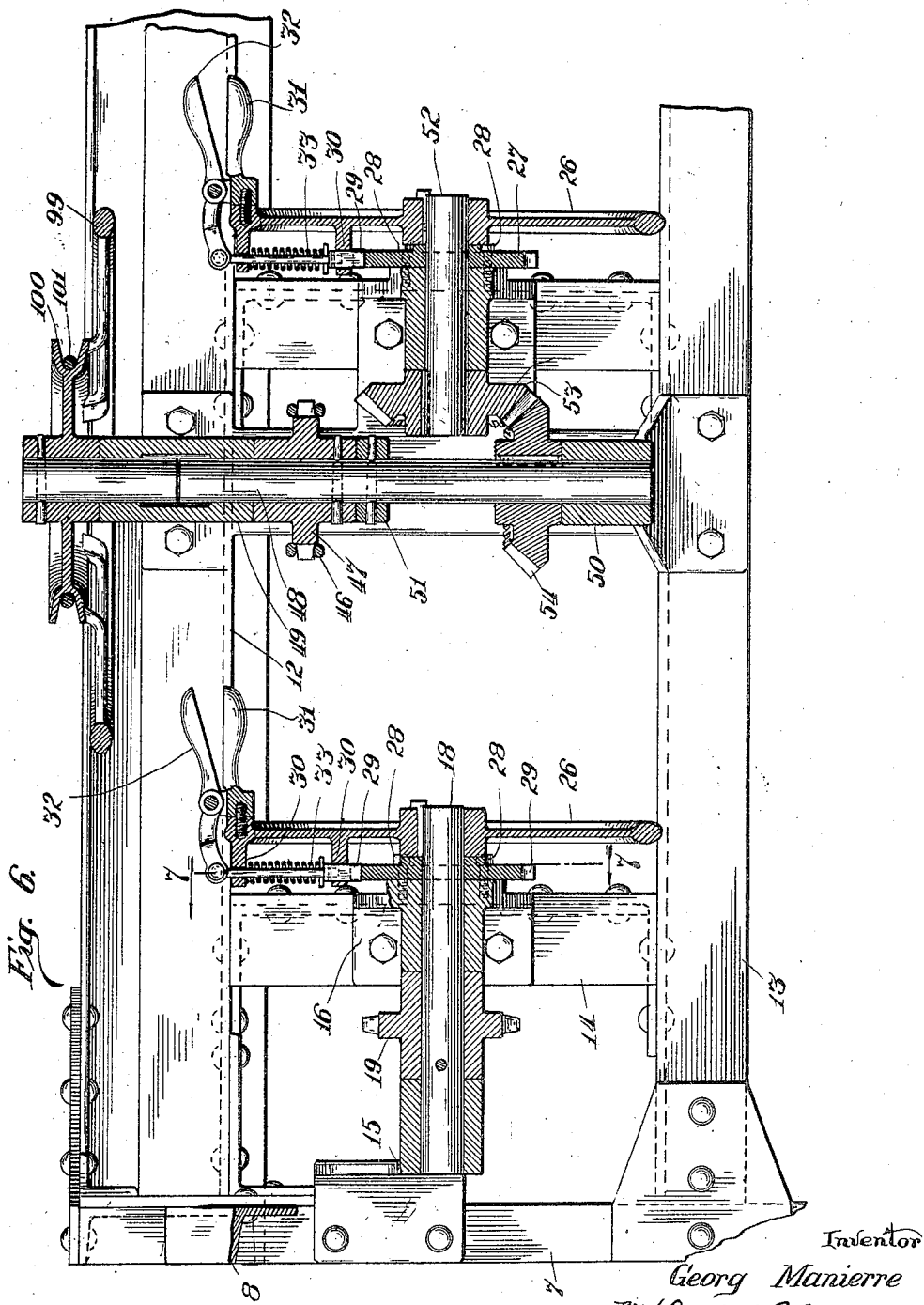

Feb. 5, 1924. 1,482,474
G. MANIERRE
MACHINE FOR UNLOADING RAILROAD CARS
Filed Oct. 2, 1920 12 Sheets-Sheet 6
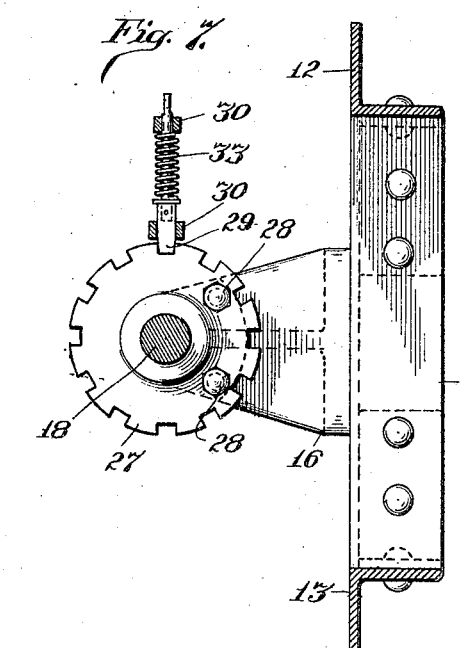
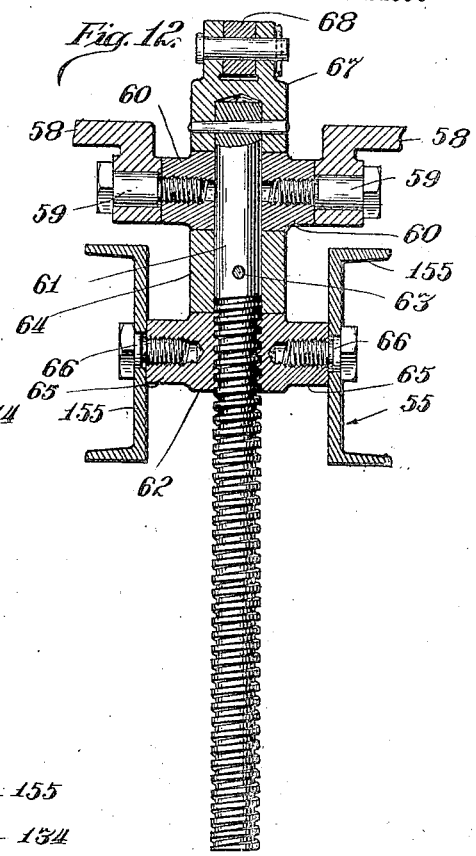
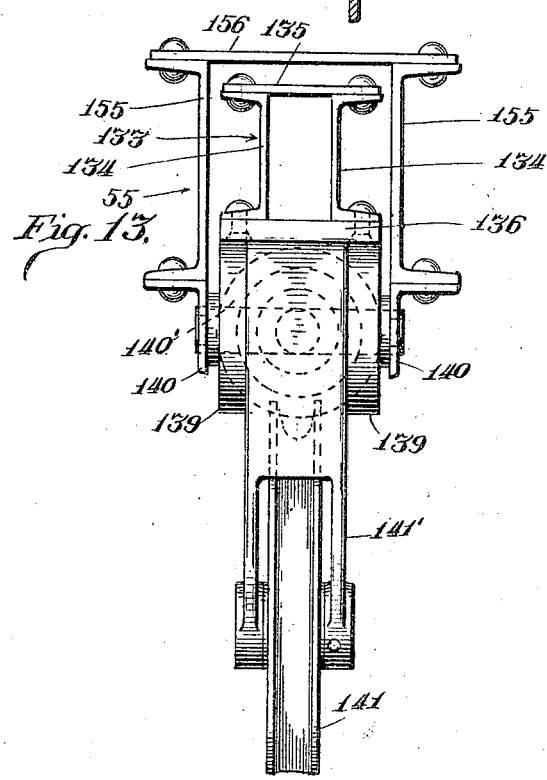
Inventor
George Manierre
By Daniel of Brennan
Attorney

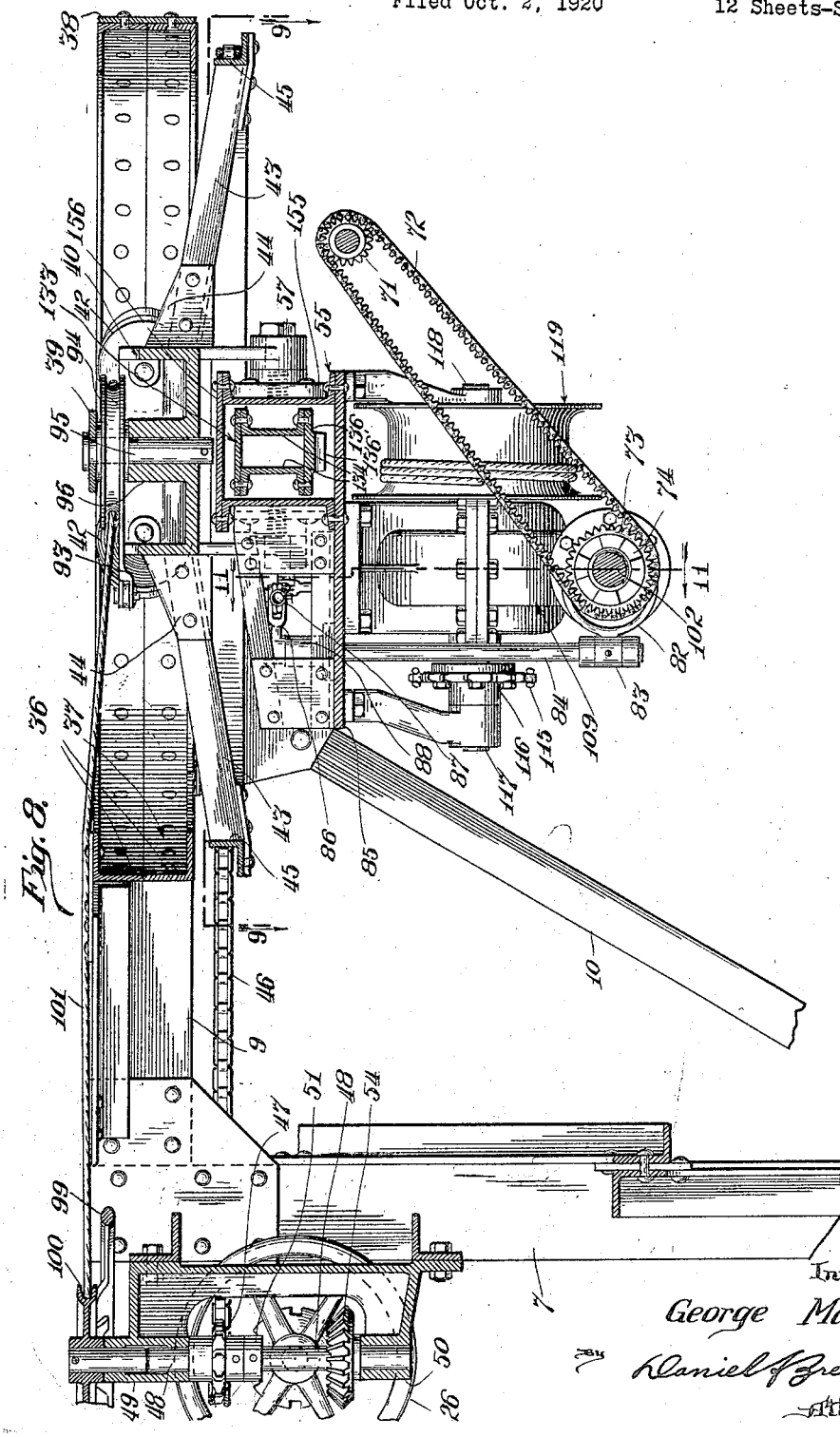

Feb. 5, 1924.
G. MANIERRE
1,482,474
MACHINE FOR UNLOADING RAILROAD CARS
Filed Oct. 2, 1920    12 Sheets-Sheet 8
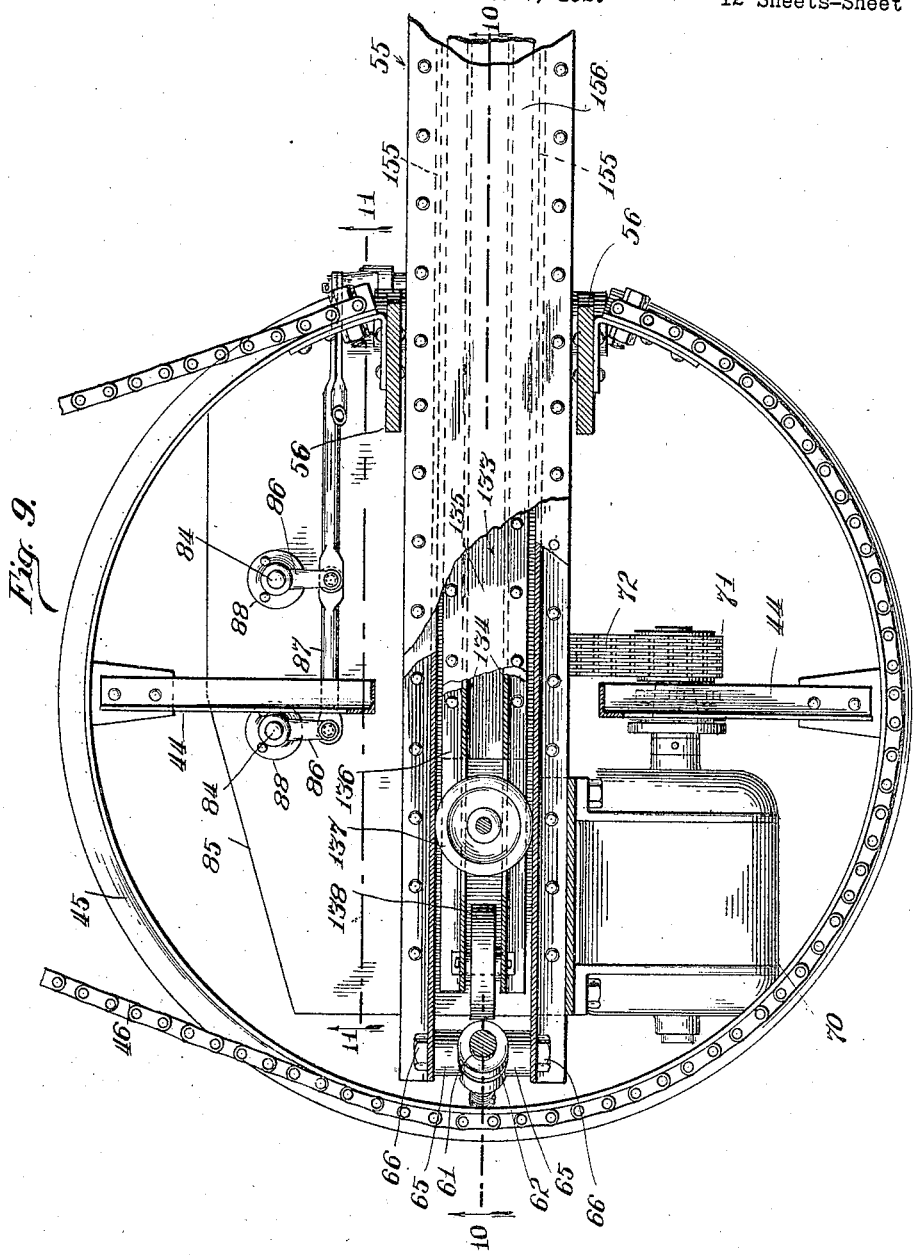
Inventor
George Manierre
By Daniel Brennan.
Attorney.

Feb. 5, 1924.

G. MANIERRE 1,482,474

MACHINE FOR UNLOADING RAILROAD CARS

Filed Oct. 2, 1920      12 Sheets-Sheet 9

Inventor

George Manierre

By Daniel J. Brennan.

Attorney.

Feb. 5, 1924.    1,482,474
G. MANIERRE
MACHINE FOR UNLOADING RAILROAD CARS
Filed Oct. 2, 1920    12 Sheets-Sheet 10

Fig. 11.

Inventor
George Manierre
By Daniel J Brennan
Attorney.

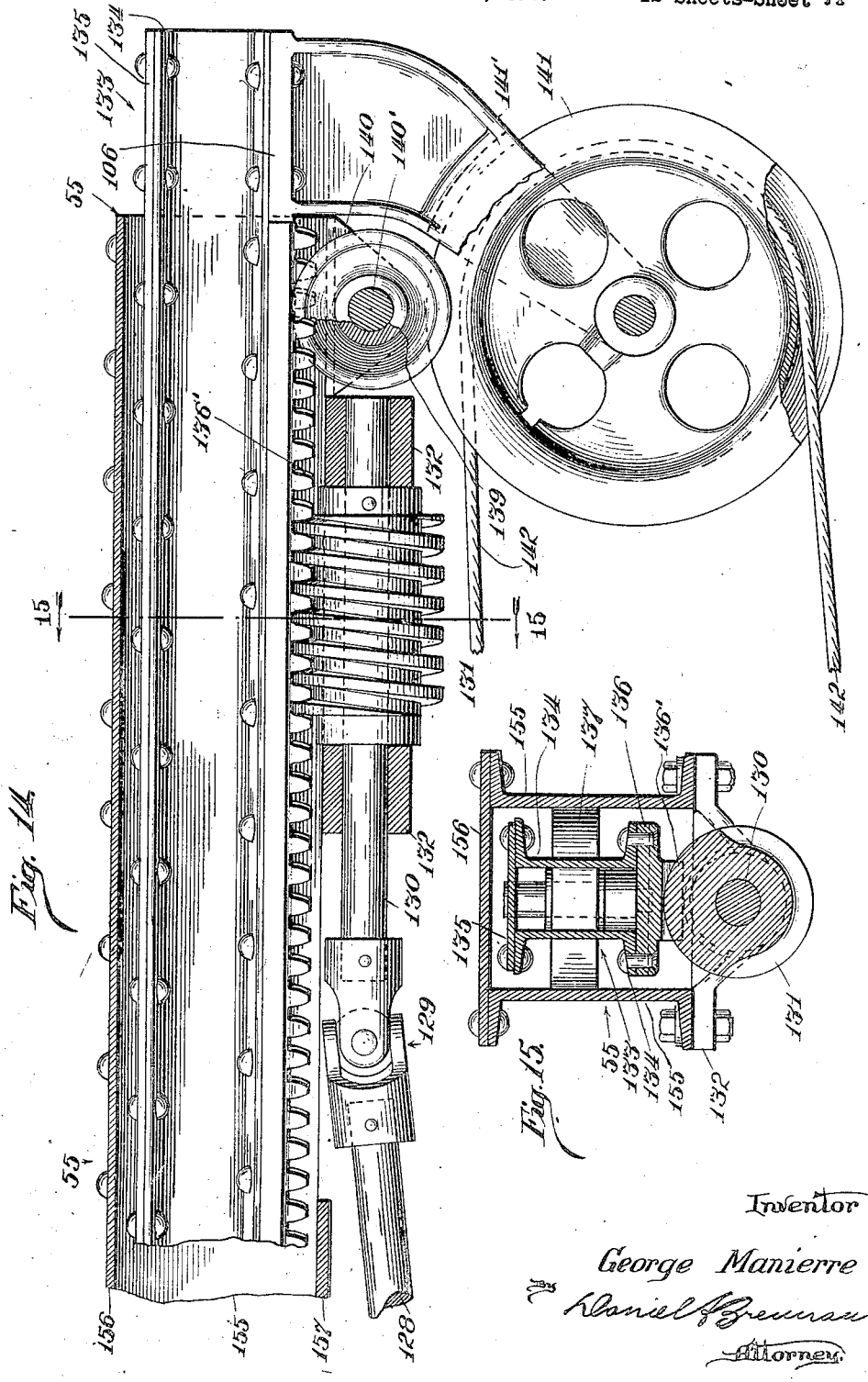

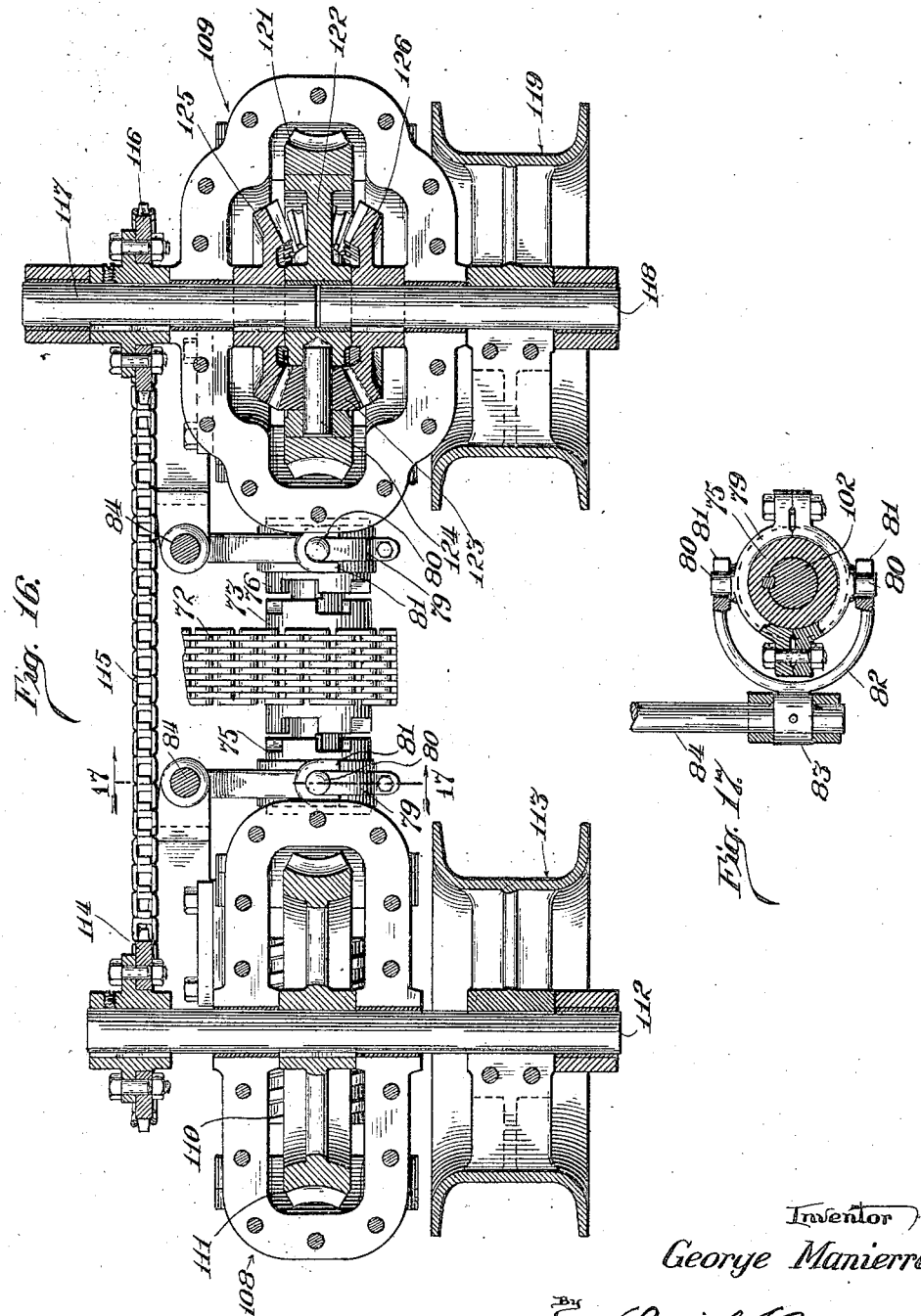

Patented Feb. 5, 1924.

1,482,474

UNITED STATES PATENT OFFICE.

GEORGE MANIERRE, OF MILWAUKEE, WISCONSIN.

MACHINE FOR UNLOADING RAILROAD CARS.

Application filed October 2, 1920. Serial No. 414,272.

*To all whom it may concern:*

Be it known that I, GEORGE MANIERRE, a citizen of the United States, residing at Milwaukee, county of Milwaukee, and State of Wisconsin, have invented a new and useful Improvement in a Machine for Unloading Railroad Cars, of which the following is a specification.

This invention relates to a machine for unloading railroad cars.

The objects are to provide a machine for removing bulk material from so called closed or box cars, and to reach with a drag shovel all places in the car for conveying in each operation a part of the material towards the door.

It is another object to make the machine adjustable so as to adapt it to cars of different sizes, and to permit the discharge element to be placed at different levels for unloading material from larger or smaller heaps.

It is also an object to control the machine from a point outside the car to facilitate the unloading operation without exposing the attendant to the obnoxious or even dangerous influence of the unavoidable dust stirred up in the unloading of the car.

The invention also has the object to provide a mechanism small enough to be introduced through the door of a car and extensible to almost any point of the interior, without obstructing the door opening, but— to the contrary—to permit the material to be discharged through the opening.

With these and numerous other objects in view an embodiment of the invention is described in the following specification, and illustrated in the accompanying drawings.

In the drawings:

Fig. 1 is a top plan view of the complete device in operative relation to a railroad car;

Fig. 2 is a side elevation of the same;

Fig. 3 is a front elevation thereof;

Fig. 4 is a perspective view of the drag discharge element, shown as a drag or scraper;

Fig. 5 is on a larger scale a vertical section on line 5—5 of Fig. 1 to illustrate the carriage moving and turn-table adjusting mechanism;

Fig. 6 shows on a larger scale a section through the actuating mechanism for the carriage and through the turntable adjusting mechanism;

Fig. 7 is a detail sectional view on the line 7—7 of Fig. 6 illustrating a locking device for the actuating mechanism;

Fig. 8 is a sectional view on line 8—8 of Fig. 1 through the turn table and its supporting structure;

Fig. 9 is a horizontal section on line 9—9 of Fig. 8 illustrating the supporting structure and actuating mechanism of the turn table frame;

Fig. 11 is a sectional view on line 11—11 of Fig. 8 through the mechanism for actuating the discharge element;

Fig. 12 is a sectional view on line 12—12 of Fig. 10 showing a self-locking adjusting device of the carrier structure;

Fig. 13 is an end elevation of the carrier structure;

Fig. 14 is a longitudinal vertical section through the carrier structure to illustrate the extension means;

Fig. 15 is a transverse section on the line 15—15 of Fig. 14 of the gear transmission for extending the carrier structure;

Figure 10:
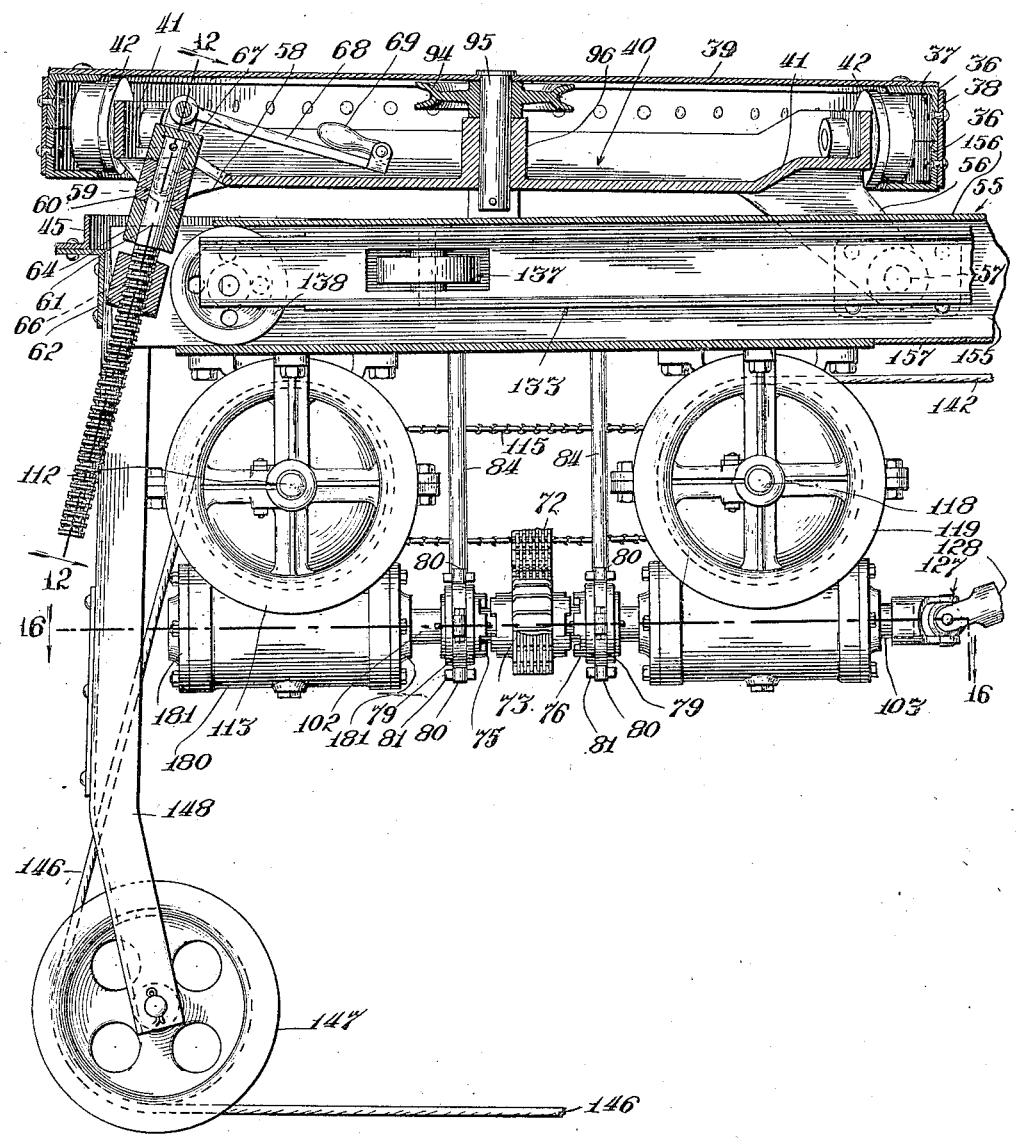
Fig. 10 is a vertical section on line 10—10 of Fig. 9 illustrating one end of the carrier for the discharge element and driving parts in elevation.

Fig. 16 is a horizontal section through the drive on line 16—16 of Figs. 10 and 11; and Fig. 17 is a detail section on line 17—17 of Fig. 16 and partly elevation of a clutch-actuating mechanism.

An unloading platform 1 is supported on a raised structure 2 and extends approximately to the track on which the cars to be unloaded are placed. Channel irons 3 are secured on the platform 1 at a suitable distance from and parallel to each other, by a plurality of brackets 4.

The channel irons 3 serve as guiding elements for the truck or carriage 5 which forms the base structure or support of the unloader. In Figs. 2 and 3 this support is shown to have a base or operator's stand 6 at the front of which posts 7 project upward. Suitable braces 8 extending slantingly from the base 6 to the top of the posts 7 serve for strengthening this structure and a cantilever 9 extends from the top of the posts 7 forward, said cantilever structure or outrigger being suitably braced by slanting struts 10.

The entire support or carriage 6 runs on wheels 11, which travel in the channels 3 and owing to the engagement of these wheels with the top flanges of the channels, a tilting of the carriage is prevented.

The actuating device for this carriage or support to move it closer to the car or to withdraw it from the car is disposed in the upright structure 7 at the front end of the carriage. Transverse straps 12 and 13 (Fig. 5) located near the top of the carriage are connected by a vertical strap 14. Bearing brackets 15 and 16 (Fig. 6) secured to a post 7 and to the vertical strap 14, serve for rotatably supporting a shaft 18 which projects beyond the bearing 16. A chain sprocket 19 is rigidly secured to the shaft 18 intermediate the two bearings 15 and 16, and a chain 20 is trained over the sprocket downward, Fig. 5, over another sprocket 21 (Figs. 2 and 5) on a countershaft 22, which is suitably supported below the platform of the truck 5. The shaft 22 carries at its projecting end another sprocket 23 over which a chain 24 is laid. This chain extends over the entire length of the platform 1 and as may be seen from Fig. 5 is placed about midway between the two tracks 3. The ends of the chain 24 are fastened to the platform and the movement of the support 5 is effected by rotation of the sprocket 23 in engagement with this chain. Sheaves or guide pulleys 25 are mounted below the sprocket 23 in front and rear thereof, Fig. 2, whereby the chain is partly looped from above over the chain sprocket 23. Owing to this arrangement the carriage can be moved back and forth between its terminal positions, the operative engagement of the driving parts is maintained in a more secure way than by having the sprocket 23 grip the chain from above.

The projecting end of the shaft 18 carries fixedly a hand wheel 26, through the rotation of which the movement of the carriage on the track 3 is effected, and the direction of this movement is dependent upon direction of rotation of the hand wheel.

For the purpose of maintaining the supporting structure 3 in the position desired, and for holding it against accidental displacement, the drive is locked and a suitable locking device associated with the actuating means for the supporting structure, is by way of example illustrated in Fig. 7. A locking disk 27 is secured by bolts 28 to the bearing 16. This locking disk has on its circumference a plurality of uniformly distributed notches into which a locking pin 29 may enter. This locking pin, as shown in Fig. 6, is movably connected with the hand wheel 26 and if, therefore, this locking pin is in the position illustrated in Fig. 7, the hand wheel 26 cannot be rotated and a rotation of the shaft 18 also is rendered impossible, thereby preventing the carriage from moving along the chain 24. The locking pin 29 is guided in the lugs 30 of the hand wheel 26 and is normally forced into operatively locking position by means of a spring 33 which surrounds the pin and which is inserted between one of the lugs 30 and a shoulder on the pin. The top of the locking pin 29 is in movable connection with a handle member 32 which is pivoted on the hand wheel 26 so as to permit withdrawal of the pin from locking engagement against the action of the spring. This handle member 32 cooperates with another handle member 31 mounted on the wheel 26, the two members 31 and 32 supplementing each other to a complete handle upon withdrawal of the pin from locking engagement and in this completion of the handle the wheel may be rotated for propelling or withdrawing the carriage.

The braces 9 of the cantilever structure are located in a horizontal plane and converge towards each other. The additional braces 10 are located in parallel vertical planes at both sides of the upright structure. The two braces 9 are united at their converging ends by a gusset plate 34, Fig. 1, and gusset plates 35 are each connected with the outer ends of the diagonal braces 10. These braces and gusset plates serve for supporting a guide or race for the turn table. This race is composed of angle irons 36 which, after having been bent into annular shape, are positioned relatively to each other so as to form a circular channel or race 37. This channel may be reinforced on its outer circumference by means of a flat bar 38. A transverse cover strap 39 (Fig. 1) is placed across the top flange of the race 37 in which the turn-table 40 is supported.

The latter is a substantially rectangular frame, having its ends 41 slightly offset upwardly, Fig. 10. The four corners of this rectangular frame support rollers 42, which travel within the circular race 37. A pair of spokes 43 is secured to opposite sides of the frame, by lugs 44, or the like, and these spokes serve for supporting an angle iron ring 45. A chain 46 has its ends secured to the ring 45 and is trained over a sprocket 47 which is rigidly mounted on a shaft 48 supported by the bearings 49 and 50 on the transverse straps 12 and 13. Another shaft 52 preferably parallel to the shaft 18 carries at one end fixedly a bevel gear 53 in engagement with a bevel gear 54 which is keyed to the upright shaft 48. The horizontal shaft 52 forming part of the turntable actuating device is equipped with a hand wheel 26 and with parts for locking the turntable against accidental angular displacement similar to the parts 27 to 33 described in connection with the locking means for the actuating device of the supporting structure 5. Upon rotation of the hand wheel 26 on shaft 52, the bevel gear 53 will cause rotation of the shaft 48. The chain trained about the sprocket 47 and secured at its ends to the ring 45 will then rotate the ring and thereby the turn table frame 40.

The turn table serves as support for the carrying structure of the discharge element. This carrying structure in the form of a boom 55 is composed of rigid elements which are movably associated with each other, whereby the overall length of the entire structure may be varied. While the carrying structure, which in this way is rendered extensible is composed of rigid elements, the actuation of the discharge element, i. e., the drag or scraper carried thereby is effected by flexible elements or tension members.

A pair of lugs 56 extend downwardly and forwardly from one end of the turn-table and support trunnion screws or pivots 57 through which the carrying structure 55 is tiltingly supported from the turn-table. The boom 55 is composed of parallel channels 155 which are placed vertical and which are united by top plate 156 and bottom plate 157. A set of lugs 58 near the rear portion of the turn-table supports trunnion screws or pivots 59 which are threaded into a sleeve 60 for a screw spindle 61. This spindle which is rotatably mounted within the sleeve 60 is provided below said sleeve with a nut 62 and this nut and the sleeve 60 are spaced from each other through a sleeve 64, which is secured to the spindle 61 by means of a pin 63. Trunnion screws 66 pass through the rear portion of the upright flanges of the boom 55 into bosses 65 projecting laterally from the nut 62 whereby, upon rotation of the spindle, an upward or downward displacement of the nut 62 is produced so as to adjust the carrying structure of the unloading element pivotally, for instance, as shown in dotted lines in Fig. 3. The rotation of the spindle 61 may be effected by means of a cap 67 which is pinned to the top of the spindle and on which is pivotally mounted a crank arm 68 having a foldable handle 69, Fig. 10. The adjustment is practically self-locking, as an automatic displacement of the nut 62 on the spindle will not take place.

A motor 70 is supported from the carrying structure 55 at one side thereof. The shaft of the motor projecting to a point approximately below the center of the turn-table carries a pulley 71 over which a chain belt 72 is trained. This belt drives a central clutch portion 73 which is loosely mounted on a bushing 74, described below. The companion clutch members 75 and 76 on the shafts 102 and 103 respectively are disposed one on each side of the central clutch member 73, over which the belt chain 72 is trained. These clutch members are provided with faces adapted to cooperate with the corresponding clutch face of the loose clutch member 73 if they are shifted into engagement therewith.

For the purpose of effecting this selective engagement of either one or the other of these fixed clutch members with the loose clutch 73, the clutches 75 and 76 are provided with split rings 79 having at diametrically opposite points trunnion pins 80, Fig. 17. The bifurcated ends 81 of a yoke 82 embrace the pins and the enlarged center portion 83 is fixed to the foot end of a rod 84. Through turning the rod in one or the other direction, a swinging movement will be communicated to the arms 81, and the clutches 75 or 76 may be shifted selectively to operative or inoperative position, respectively. The rods 84 extend upwardly through a cover plate 85, Fig. 9, which forms a part of the carrying structure 55, and they are each provided with a crank arm 86. These crank arms are connected by means of a rigid link 87. It is obvious, therefore, that upon shifting movement of this bar in one or the other direction, both of the clutches will be influenced simultaneously whereby from a central position of both clutches either one of them may be moved to operative position, while simultaneously the other one may be disengaged. The arms 86 which are connected by the rigid bar 87 are supported on the plate 85 by brackets 88, Fig. 11.

In order to impart a swinging movement to the arms 86, a rod 89 is pivotally connected with one of said arms, and extends outwardly to a pin 90 which is supported by the upstanding arm on a rock shaft 91. Another arm 92 is also secured to the pivot 90 and is at its other end in pivotal connection with a horizontal arm 93, Fig. 8, which is fixed to a sheave 94 rotatable about a pin 95. This pin is supported in vertical position in a central bearing 96 preferably integral with the frame 40 of the turn-table.

When the sheave 94 is turned about the pin 95, the arm 93 also will be swung about the axis of said pin and this swinging movement will shift the long rod 92 thereby displacing longitudinally the rod 89, which controls the link 87 of the cranks 86 for the clutch rods 84. The rotation of the sheave 94 is derived from rotation of a hand wheel 99, which is mounted on top of the vertical shaft 48 and which is integral with or firmly connected to another sheave 100, the two sheaves, 94 and 100, being connected by a cord or belt 101, the ends of which are fastened to one of these sheaves, Fig. 1.

The two shafts 102 and 103 (Fig. 11) are in axial alignment with each other. The shaft 102 terminates in a reduced portion 104 rotatable within a bushing 105 in a corresponding bore of the shaft 103. The central or loose clutch member 74 is mounted on a bushing 107 which is loose on both shafts and has an inwardly projecting annular shoulder 106 for holding it against displacement on the free ends of the shafts 102 and 103.

The plate 85, supports two gear casings, 108 and 109, each containing a self-locking worm gear transmission, Fig. 11. The shaft 102 mounted in an extension 180 of the casing 108 carries a worm 110 in driving engagement with a worm gear 111, fixed on a shaft 112 traversing the casing and supported in bearings formed by the abutting parts of the casing 108. The shaft 102 also is supported in bearings 181 closing the extension 180, in which the worm 110 rotates. The shaft 112 projects at both ends from the casing 108 and carries fixedly secured thereto on one end a cable drum 113, while the opposite end has firmly connected thereto a sprocket wheel 114. A chain 115 is trained over this sprocket wheel and over a sprocket wheel 116 on a shaft 117 which is mounted in the gear casing 109. This casing supports, in addition to the shaft 117, another shaft 118 in axial alignment therewith and a drum 119 is rigidly secured to the projecting end of the shaft 118. An extension 190 on the casing 109 contains the shaft 103 with worm 120. The worm 110 has a double thread, while the worm 120 has a single thread.

The casing 109 contains a differential transmission mechanism which constitutes a flexible clutch between the shafts 117 and 118. The differential mechanism comprises the driving gear 121 in the form of a ring provided with spiral gear teeth adapted for engagement with the teeth on the worm 120. A spider 122 carrying a number of bevel gears 123 is supported by a bushing on the abutting ends of the shafts 117 and 118. The bevel pinions 123 are connected by pins 124 with the gear ring 121 so as to revolve about the common axis of the shafts 117 and 118 when the ring 121 rotates. The shafts 117 and 118 are equipped with bevel gears 125 and 126, respectively, which are in operative engagement with the bevel pinions 123. The general construction of this differential mechanism is known and may be replaced by any other suitable flexible clutch connection.

A universal joint 127 is mounted on the projecting end of the shaft 103 and is secured to a slanting and telescoping shaft 128, the opposite end of which also is provided with a universal coupling 129, Fig. 14, which establishes connection between the shaft 128 and a shaft 130, on which a worm 131 is rigidly secured. The shaft 130 is supported in bearings 132 which are mounted on the carrying structure 55 near the free end thereof. The boom 55 contains an extension member 133 also composed of parallel channels 134, which are connected by a top plate 135 and a bottom plate 136. The latter may be constructed as a rack bar having teeth 137 adapted to mesh with the teeth of the worm 131 whereby through the rotation of said worm a longitudinal displacement of the beam 133 is effected, and the extension or shortening of the carrying structure 55 is produced.

For maintaining the beam 133 in suitable operative position, with respect to its driving element 131, the beam is guided in the interior of the boom 55. The centering roller 137 (Fig. 10) rotates in a horizontal plane and is carried on a shaft suitably supported near the rear end of the beam 133. It contacts the inner opposite surfaces of the channels 155 and prevents lateral displacement of the beam 133, with respect to the outer part of the structure. Another roller 138 turns in vertical plane near the rear end of the beam and travels in contact with the top 156 and bottom plate 157 of the outer part so as to prevent displacement of the beam 133 upwardly or downwardly, with respect to the boom. A set of additional guide rollers 139 (Fig. 13) is secured to the free end of the outer member by means of brackets 140, the supporting pin 140' for these rollers extending transversely of the carrying structure below the same so as to give clearance for the movement of the beam 133 longitudinally of the outer part.

The beam carries at its free forward end a bracket 141' which is bifurcated near its lower end to support therein a sheave 141 over which a tension member in the form of a cable 142 is trained. One end of this cable is secured at 143 to the discharge element constructed as a drag or scraper 144 (Fig. 3) while the other end of the cable 142 is rigidly secured to the cable drum 119. A flexible suspension structure 145 fastened to the corners of the drag 144 serves for the attachment of the end of another cable 146, the other end of which is fastened to the cable drum 113 on the shaft 112. This tension member 146 is also trained over a pulley or sheave 147 secured to arms 148, which are mounted on the turntable or on a part rotatable therewith and which converge downwardly, as indicated in Fig. 2, the lower end of these arms serving for receiving the idler 147. The drag 144 preferably consists of a square board, as illustrated in Fig. 4, having near its corners the eye bolts 150 which serve for attachment of the flexible supporting structure 145. Some of these bolts also may serve for attaching a wire or cable 151 at the center of which the cable 142 is secured.

The carriage or truck also is equipped with a controller box 153, through which the speed of the motor 70 and the direction of rotation of the same may be suitably controlled in a well known way.

The operation of the device is approximately as follows:

The car to be unloaded, is moved near the platform 1 so that the door of the car is approximately above or near the inlet opening of an elevator spout, or the like, (not shown) from which the material can be removed through suction, or some other suitable conveyer (not shown) may carry the discharged material away. The door having been opened and sufficient of the material having fallen out, the carriage 6 is advanced to unloading position until the cantilever structure 9 is in the interior of the car. It will be noted that owing to the raised position of the part projecting into the car the material may drop through the door in the space below the carrying and cantilever structure. The actuation of the carriage to advance the same over the the track 3 and the actuations of the turn-table in order to turn the carrying structure 55 may take place simultaneously. After the boom 55 in non-extended position has been introduced into the car, and after the turn-table with this carrying structure has been suitably adjusted in a vertical plane by the spindle 61, and is directed towards one end of the car, the attendant, through the controller 153 starts the motor 70. He then turns the hand wheel 99 for throwing in the clutch 74, whereby rotation is communicated to the worm 120. It may be remembered that the drag 144 is still near the door, approximately below the cantilever structure and the boom 55 is not extended.

Through the telescoping shaft 128 connected with this worm 120 the worm 131 will cause the extension of the boom. During this operation the other worm 110 remains at rest. The worm gear transmission between the worm 110 and its gear 111 is self-locking so as to prevent rotation of the shaft 112 and thereby also rotation of the sprockets 114 and 116, the last named sprocket being mounted on the shaft 117. As the bevel gear 125 on the shaft 117 is thereby held against rotation, the drive transmitted through the worm gear ring 121 to the bevel pinions 123 and from them to the bevel gear 126 will cause the latter to rotate, as in an ordinary differential, with twice the speed with which it would rotate if bevel gear 125 would be free to move. The drum 119 on which the cable 142 is wound will, therefore, be rotated in a direction to pay out this cable at double speed, which is necessary as both strands of the tension member have to be extended, the tension member 146 remaining at rest.

After the boom has been extended to reach the end of the car, the discharge element 144 must now be moved to the same end, and for this purpose the hand wheel 99 is turned to move the clutch 76 out of engagement with the central clutch member 73 and to throw the other clutch 75 into operative position. The worm 120 is thereby disengaged from its driving relation and the worm 110 is driven by the motor. The worm gear 111 and the shaft 112 now drive the drum 113 and the sprocket 114. The chain 115 transmits the movement to the shaft 117, which through the bevel gear 125 revolves the set of bevel pinions 123, causing thereby the rotation of the other bevel gear 126. The two drums 113 and 119 are thereby driven at the same speed, but in opposite direction, the differential gearing inserted between the shafts 117 and 118 permitting the device to maintain the tension members permanently in taut condition.

After the drag 144 has been moved to the end of the car, with the boom extended, as shown in Fig. 3, and when it is desired to use now the drag for scraping the material out of the car, the operator leaves clutch 75 in operative position, but reverses the direction of the motor 70 by manipulation of the controller switch 153. The tension member 146 will then be wound up on drum 113 and released from drum 119, the two drums rotating again at about the same speed, in opposite direction relatively to each other, and each drum reverse in direction relatively to the preceding operation.

This manipulation of the controller switch 152 is repeated, with the clutch 75 in operative position, until that side of the car towards which the boom has been pointed is sufficiently cleaned out. Between each two unloading movements of the discharge element 144 the turn-table and boom may be adjusted horizontally or vertically, or in both directions to bring the discharge element into engagement on selected points of the material in the car.

When it is desired to begin the unloading of the other side of the car it may become necessary again to shorten the carrying structure 55 for the discharge element 144 before the structure can be turned. For this purpose the operator throws clutch 76 into operation, but drives the shaft 103 and worm 120 now in a direction opposite to that in which these elements were rotated for extending the boom. The drum 113 again remains at rest and the drum 119 winds up the tension member 142 at double speed.

It may become necessary to withdraw the supporting structure 5 from the car to gain space for turning the carrying structure 55 towards the other side of the car, and to advance this supporting structure again after the boom has been reintroduced. The operations may be repeated on the two sides of the car (assuming that the car door is in the middle of the car side) until a final cleaning out may be accomplished by hand.

In practice it has been found that 90% of the cargo may be removed by the machine with great speed and safety and without that inconvenience to workingmen which seems inevitable in the unloading of certain bulk material as lime, fertilizer and the like. The effective unloading operation is due to the fact that the discharge element can be placed into any desired position within the car by imparting it a reciprocating and a swinging movement, either selectively or simultaneously as desired.

I claim:

1. A car unloading machine, comprising in combination a discharge element adapted to be introduced into the car, a carrying structure for the discharge element, and a motor driven mechanism fixed on the carrying structure adapted to be introduced into the car for actuating the discharge element.

2. A car unloading machine, comprising in combination a discharge element adapted to be introduced into the car, a carrying structure for the discharge element, and a motor driven mechanism fixed on the carrying structure adapted to be introduced into the car for reciprocating the discharge element.

3. A car unloading machine, comprising in combination a discharge element adapted to be introduced into the car, a carrying structure for the discharge element, and a motor driven mechanism fixed on the carrying structure adapted to be introduced into the car controlled from a point outside the car for actuating the discharge element.

4. A car unloading machine, comprising in combination a discharge element adapted to be introduced into the car, a carrying structure for the discharge element, and a motor driven mechanism fixed on the carrying structure adapted to be introduced into the car for imparting a swinging movement to the discharge element.

5. A car unloading machine, comprising in combination a discharge element adapted to be introduced into the car, a carrying structure for the discharge element, and a motor driven mechanism fixed on the carrying structure adapted to be introduced into the car for selectively reciprocating or swinging the discharge element.

6. A car unloading machine, comprising in combination a discharge element, an extensible carrying structure for the discharge element, and a motor driven mechanism supported from the carrying structure and adapted to be introduced into the car for actuating the discharge element.

7. A car unloading machine, comprising in combination a discharge element, an extensible carrying structure composed of substantially rigid members for the discharge element, and a motor driven mechanism fixedly supported from the carrying structure and adapted for introduction into the car for actuating the discharge element.

8. A car unloading machine, comprising in combination a discharge element adapted to be introduced into the car, a carrying structure for the discharge element, the carrying structure also being introduceable into the car, and a mechanism adapted to be introduced into the car for actuating the discharge element, said mechanism being supported by said carrying structure.

9. A car unloading machine, comprising in combination a discharge element adapted to be introduced through the door of the car, a carrying structure for the discharge element, tension members flexibly connecting the discharge element with the carrying structure, drums mounted on the carrying structure and on which the tension members are wound, and means also rigidly supported by the carrying structure and adapted to be introduced into the car for actuating the drums to pull the discharge element away from and towards the door.

10. A car unloading machine, comprising a discharge element adapted to be introduced into the car, a carrying structure for the discharge element, tension members supporting the discharge element, drums mounted on the carrying structure and on which the tension members are wound, and mechanism supported by said carrying structure and adapted to be introduced into the car for rotating one of said drums independently of the other.

11. A car unloading machine, comprising a discharge element adapted to be introduced into the car, a carrying structure for the discharge element, tension members supporting the discharge element, drums on the carrying structure, and on which the tension members are wound, and mechanism on the carrying structure and adapted to be introduced into the car for rotating both of said drums simultaneously in opposite directions.

12. A car unloading machine, comprising a discharge element adapted to be introduced into the car, a carrying structure for said discharge element, tension members supporting the discharge element, drums on the carrying structure and on which the tension members are wound, and mechanism adapted to be introduced into the car for rotating both of said drums simultaneously at equal speed.

13. A car unloading machine, comprising in combination, a discharge element adapted to be introduced into the car, an extensible carrying structure for the same, a motor and means driven by said motor for successively extending the carrying structure, reciprocating the discharge element over the entire length of the extended carrying structure and contracting the carrying structure.

14. A car unloading machine, comprising in combination, a discharge element adapted to be introduced into the car, an extensible carrying structure for the same, a permanently rotating motor, a pair of shafts normally out of driving relation with said motor, and means controlled by said shafts for selectively extending and contracting the carrying structure and for reciprocating the discharge element.

15. A car unloading machine, comprising in combination a discharge element adapted to be introduced into the car, a carrying structure for the discharge element, tension members flexibly connecting the discharge element with the carrying structure, and a mechanism adapted to be introduced into the car for lengthening and shortening the tension members, said mechanism including means for maintaining one of said tension members in taut condition.

16. A car unloading machine, comprising in combination, a discharge element adapted to be introduced into the car, an extensible carrying structure for the same, a permanently rotating motor, a pair of shafts normally out of driving relation with said motor, a support for the machine located outside the car, clutches for selectively bringing said shafts into operative relation with the motor, means operable from said support for actuating the clutches and means controlled by said shafts for selectively extending and contracting the carrying structure and for reciprocating the discharge element.

17. A car unloading machine, comprising in combination, a discharge element adapted to be introduced into the car, an extensible carrying structure for the same, a permanently rotating motor, a pair of shafts normally out of driving relation with said motor, clutches for selectively bringing said shafts into driving relation to said motor, and means controlled by said shafts for selectively extending and contracting the carrying structure and for reciprocating the discharge element.

18. A car unloading machine, comprising in combination a discharge element adapted to be introduced into the car, a carrying structure for the discharge element, a turntable supporting the carrying structure, self-locking means on the turntable for tilting the carrying structure relatively to the turntable and mechanism for actuating the discharge element, said carrying structure, turntable and mechanism being adapted for introduction into the car.

19. A car unloading machine, comprising in combination a discharge element adapted to be introduced into the car, a carrying structure for the discharge element, a turntable supporting the carrying structure, means for tilting the carrying structure relatively to the turntable, means for rotating the turntable, and mechanism for actuating the discharge element, said carrying structure, turntable and mechanism being adapted for introduction into the car.

20. A car unloading machine, comprising in combination a discharge element adapted to be introduced into the car, a carrying structure for the discharge element, a turntable supporting the carrying structure, means for tilting the carrying structure relatively to the turntable, means operable from outside the car for rotating the turntable, and mechanism for actuating the discharge element, said carrying structure, turntable, tilting means and mechanism being adapted for introduction into the car.

21. A car unloading machine, comprising in combination a discharge element adapted to be introduced into the car, a carrying structure for the discharge element, a turntable supporting the carrying structure, means for tilting the carrying structure relatively to the turntable, means for rotating the turntable within predetermined limits, mechanism for actuating the discharge element and means for introducing the carrying structure, turntable and mechanism into the car.

22. A car unloading machine, comprising in combination a discharge element adapted to be introduced into the car, a carrying structure for the discharge element, a turntable supporting the carrying structure, means for tilting the carrying structure relatively to the turntable, means for rotating the turntable within predetermined limits in a horizontal plane, mechanism for actuating the discharge element and means for introducing the carrying structure, turntable and mechanism into the car.

23. A car unloading machine, comprising in combination a discharge element adapted to be introduced into the car, a carrying structure for the discharge element, a turntable from which the carrying structure is suspended, a screw spindle rotatably mounted in the turntable, a nut associated with the carrying structure and engaging the spindle, whereby upon rotation of the spindle the relative position of carrying structure and turntable may be varied, and mechanism supported by said carrying structure between said spindle and the discharge element for actuating the discharge element.

24. A car unloading machine, comprising in combination a discharge element adapted to be introduced into the car, a telescoping boom from which said discharge element is supported, a motor carried by the boom, a double set of worm gearing selectively operable from the motor, tension elements associated with the worm gearing, and means controlled by the worm gearing for selectively lengthening and shortening said tension elements.

25. A car unloading machine, comprising in combination a drag adapted to be introduced into the car, a telescoping boom from which the drag is suspended, a motor supported by said boom, a worm gear transmission operated by said motor for extending and shortening the boom, and another worm gear transmission, also driven by said motor, for reciprocating the drag.

26. A car unloading machine, comprising in combination a drag adapted to be introduced into the car, a pair of cables secured to the drag, drums on which each of said cables is wound, and a motor for positively rotating either of said drums at different speeds to wind and unwind the cables of the drag.

27. A car unloading machine, comprising in combination a drag adapted to be introduced into the car, a telescoping boom, a motor secured to the boom on one side thereof, a set of differential worm gear transmissions supported from the boom on the other side thereof, means for operatively connecting the motor with either one or the other of said worm gear transmissions, drums driven by said gear transmissions, and cable connected with the drag and with said drums respectively.

28. A car unloading machine, comprising in combination a drag adapted to be introduced into the car, a boom, a motor carried by the boom, a rotary element in permanent driving relation with said motor, a pair of shafts in alignment with each other and loosely connected with said rotating element, means for selectively establishing driving connection between either of said shafts and the rotating element, worms mounted on each of said shafts, worm gears supported from the boom and in driving relation with said worms, and drums operatively associated with said worm gears, said drums being flexibly connected with the drag.

29. A car unloading machine, comprising in combination a drag adapted to be introduced into the car, a boom, a motor supported by the boom, a rotating element in permanent driving relation with the motor, a pair of aligned shafts associated with said rotating element and normally out of driving relation therewith, means for selectively bringing either of said shafts into driving relation with said rotating element, worms mounted on said shafts, a worm gear in operative relation with one of said worms and fixedly connected with a drum, a cable extending from said drum to the drag, a ring worm gear operatively associated with the other worm, a spider rotatably mounted within said ring gear, bevel gears in driving relation with said spider, and shafts on which the bevel gears are mounted, one of said shafts carrying a drum flexibly connected with the drag and the other of said shafts being in driving relation with the shaft of the first mentioned bevel gear.

30. A car unloading machine, comprising in combination a drag adapted to be introduced into the car, cables connected with the drag, a telescoping boom, a motor supported from said telescoping boom, a rotating driving element in permanent operative association with the motor, a pair of aligned shafts, means for selectively connecting the rotating element with either of said shafts, drums driven by said shafts and connected to said cables, and means for automatically disengaging one shaft from driving relation with the rotating element when the other shaft is brought into driving relation therewith, and vice versa.

31. A car unloading machine, comprising in combination a drag adapted to be introduced into the car, a telescoping boom from which the drag is suspended, a motor carried by the boom, a rotating element in permanent driving relation with the motor, a pair of shafts, means for selectively bringing either one of said shafts into driving relation with said rotating element, a telescoping shaft flexibly connected with one of said first named shafts, a worm secured to one of the members of the telescoping boom, and operatively connected to said telescoping shaft, a rack in engagement with said worm gear and secured to the other member of the telescoping boom, and flexible means for reciprocating the drag through rotation of said first named shafts.

32. A car unloading machine, comprising in combination a drag adapted to be introduced into the car, a telescoping boom, a motor carried by the telescoping boom, a pair of aligned shafts, means for selectively bringing either one of said shafts into driving relation with said motor, worms mounted on said shafts, worm gears in engagement with said worms, drums selectively driven by said worm gears, flexible connections between said drums and the drag, and means interposed between one of said shafts and a member of the telescoping boom for extending and contracting said boom upon rotation of said shaft.

33. A car unloading machine, comprising in combination a drag adapted to be introduced into the car, a box-shaped girder, another box-shaped girder movably mounted in the first named girder, a motor mounted on the first named girder for moving the second girder relatively thereto and for reciprocating the drag, flexible members secured to the drag, and guiding elements for the flexible members, one of said guiding elements being mounted on one of said girders and another guiding element being mounted on the second girder.

34. A car unloading machine, comprising in combination a drag adapted to be introduced into the car, a box-shaped girder, a second box-shaped girder of smaller cross-section and having each of its walls spaced from the walls of the first named girders, guiding rollers secured to the second girder and rotatable in a horizontal and a vertical plane respectively within said first named girder, and means on the first named girder for actuating the drag and for moving the second named girder with respect to the first named girder.

35. A car unloading machine, comprising in combination a drag adapted to be introduced into the car, a telescoping boom, a turntable from which said boom is suspended, a circular race for supporting the turntable, and a cantilever structure carrying said circular race, said boom, turntable and race being adapted for introduction into the car.

36. A car unloading machine, comprising in combination a drag adapted to be introduced into the car, a telescoping boom, means on the boom for actuating the drag, a turntable of substantially rectangular shape carrying the boom, rollers adjacent the corners of said turntable, a circular race for said rollers, and a cantilever structure by which said race is carried.

37. A car unloading machine, comprising in combination a drag adapted to be introduced into the car, a boom, actuating means for the drag mounted on the boom, a turntable from which the boom is supported, a pair of angle irons bent into circular shape and disposed with adjacent edges so as to form a circular channel, rollers on the turntable riding in said circular channel, and a cantilever structure on which said circular channel is immovably carried.

38. A car unloading machine, comprising in combination a support for the machine, a drag adapted to be introduced into the car, a boom, actuating means for the drag supported by the boom, a turntable on which the boom is supported, a circular channel for guiding the turntable, a ring fixedly connected with the turntable, a cantilever structure associated with the support of the machine and holding said circular channel, means on the support of the machine for actuating the turntable, and a flexible connection extending from said ring to the actuating means on the support.

39. A car unloading machine, comprising in combination a discharge element adapted to be introduced into the car, a boom, actuating means for the discharge element supported by the boom, a turntable carrying the boom, a cantilever structure movably supporting the turntable, a support for the cantilever structure, a ring fixedly associated with the turntable, a chain dead-ended on the ring, actuating means on the support for the cantilever structure associated with the chain, and means for locking said actuating means in predetermined position.

40. A car unloading machine, comprising in combination a support for the machine having a platform and an upright structure, a cantilever structure resting against the upright structure, a circular channel carried by the cantilever structure, a turntable movable in said circular channel, an extensible boom connected with the turntable, a vertical shaft on the support of the machine, means for driving said vertical shaft, a chain associated with said vertical shaft and with the turntable, means for limiting the rotary movement of said turntable by said chain, a discharge element, and means carried on the boom for actuating the discharge element, said last named means being independent of the actuating means for the turntable.

41. A car unloading machine, comprising in combination a discharge element adapted to be introduced into the car, an extensible boom on which the discharge element is carried, means on said boom for actuating the discharge element, said means including a motor, a rotating element in permanent driving relation with the motor, a pair of aligned shafts, drums driven by said shafts and flexibly connected with the discharge element, clutches for moving either of said shafts into driving relation with said rotating element, a support for the machine, and means controllable from the support of the machine for actuating said clutches.

42. A car unloading machine, comprising in combination a discharge element, a boom, actuating means mounted on the boom for the discharge element, said actuating means including a motor, a rotatable element in permanent driving relation with the motor, a pair of aligned shafts, drums in driving relation with said shafts and flexibly connected with the discharge element, a pair of clutches for throwing either one of said shafts into driving relation with the rotatable element, a turntable movable in a horizontal plane and supporting the boom, a sheave in the axis of rotation of said turntable, a support for the machine, means on the support for actuating said sheave, and a connection between said sheave and said clutches for throwing, upon rotation of said shaft, either one of said clutches into operative relation and at the same time throwing the other clutch out of operative relation.

43. A car unloading machine, comprising in combination a discharge element, an extensible boom, means carried by said boom for actuating the discharge element, a turntable on which the boom is carried, a cantilever structure, a circular channel on the cantilever structure and in which the turntable is guided, a support for the cantilever structure, and means on said support for actuating the turntable and for controlling the actuating means of the discharge element.

44. A car unloading machine, comprising in combination a discharge element adapted to be introduced into the car, an extensible boom, means mounted on the boom for actuating the discharge element, a rotatable turntable on which the boom is mounted, a support for the machine, and rotary elements in axial alinement on said support for operating the turntable and for controlling the actuating means of the discharge element respectively.

45. A car unloading machine, comprising in combination a support for the machine a discharge element adapted to be introduced into the car, a track on which the support is movably mounted, a sprocket wheel on the support, a chain dead-ended on the track and in engagement with said sprocket wheel, means for rotating the sprocket wheel, and means on said support for reciprocating the discharge element within the car.

In testimony whereof, I affix my signature in the presence of two witnesses at 445 Milwaukee Street, Milwaukee, Wisconsin.

GEORGE MANIERRE.

Witnesses:
 LEONA SEYMOUR,
 HENRY MITTELSTRASS.